Feb. 11, 1936. W. NATURKACZ 2,030,758
FEEDING ATTACHMENT FOR MEAT GRINDERS
Filed Aug. 15, 1934 2 Sheets—Sheet 2
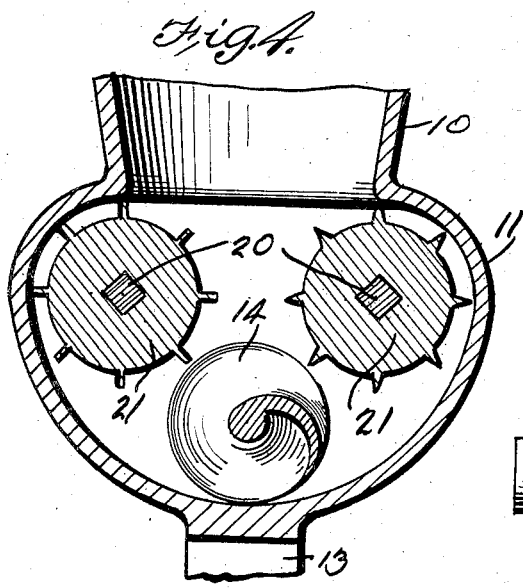
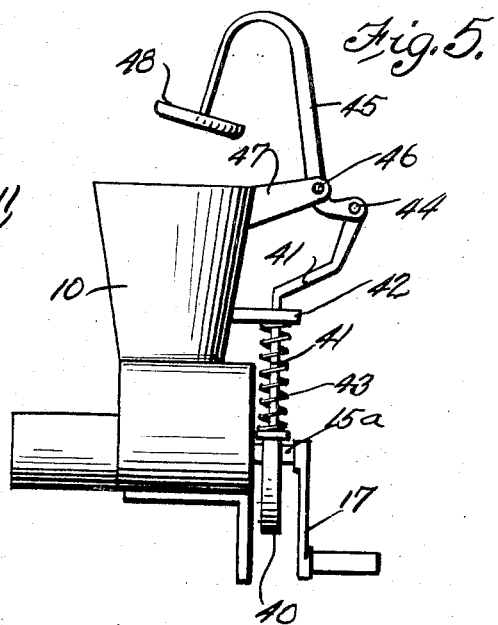
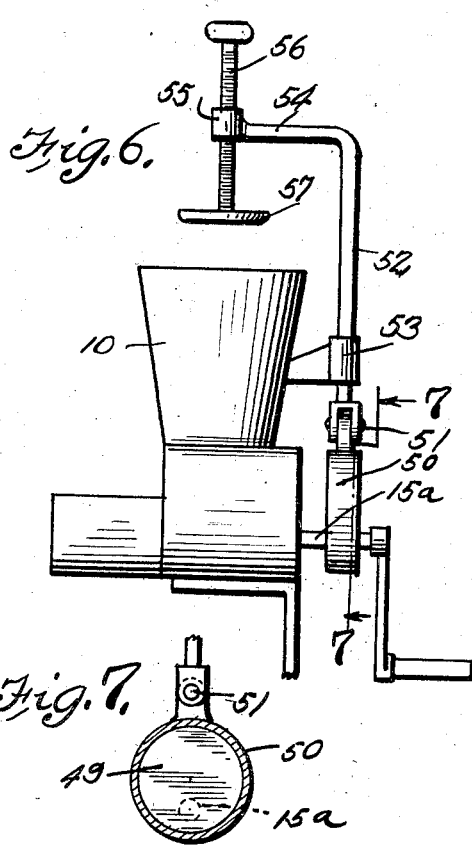
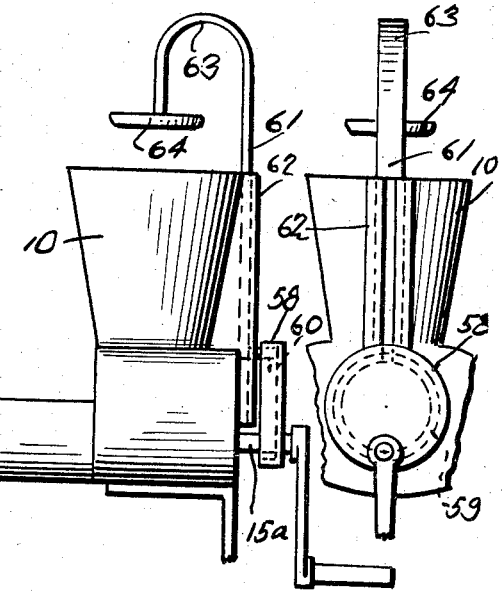
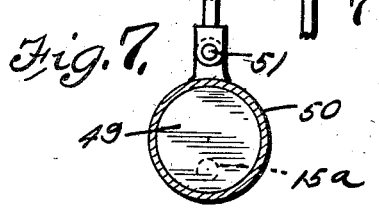
Inventor
Walter Naturkacz.
By Bryant & Lowry
Attorneys Patented Feb. 11, 1936

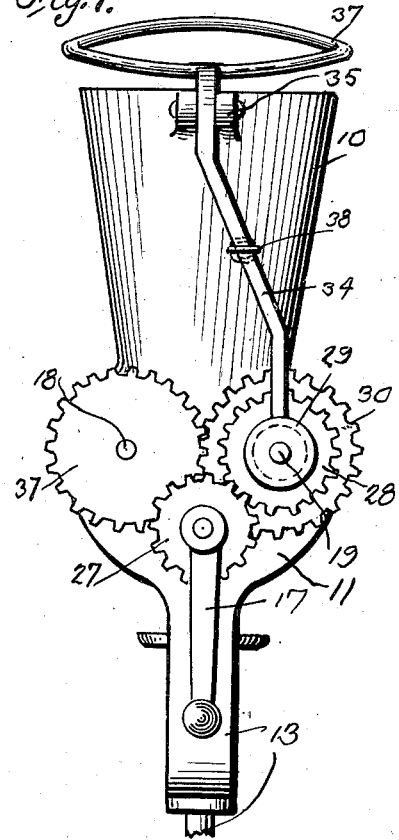
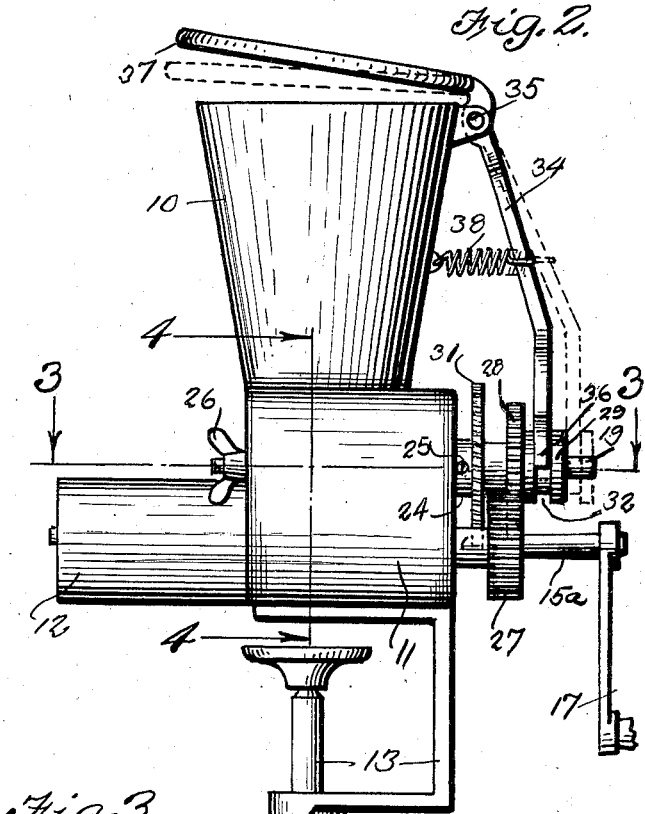
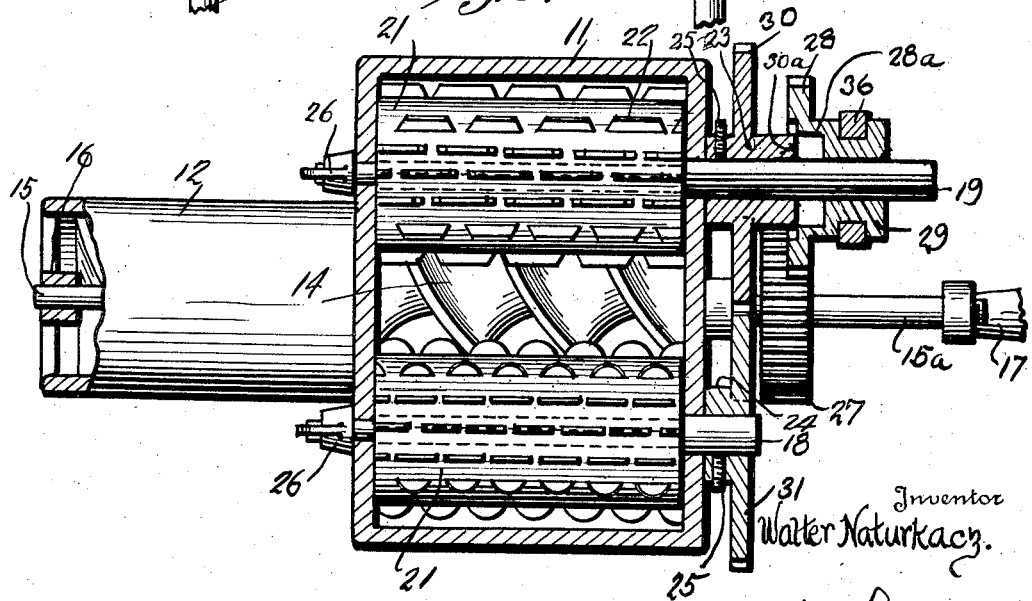

2,030,758

UNITED STATES PATENT OFFICE 2,030,758

FEEDING ATTACHMENT FOR MEAT GRINDERS

Walter Naturkacz, Buffalo, N. Y.

Application August 15, 1934, Serial No. 739,986

3 Claims. (Cl. 146—181)

This invention relates to certain new and useful improvements in feeding attachment for meat grinders.

The primary object of the invention is to provide an attachment for meat grinders and similar machines with means associated with the hopper element thereof for the feeding of material in the hopper through the grinder or cutter that is usually in the form of a cutting screw or spiral rendering it unnecessary for the operator to force the material downwardly through the hopper with his hands and thereby eliminating the possibility of injury to the operator.

A further object of the invention is to provide a feeding attachment for meat grinders of the character above set forth that is operatively engaged with the power shaft of the grinder for operation thereby. It is a further object of the invention to provide a feeding attachment of the foregoing character embodying a safety element rendered operative by the act of placing materials in the hopper of the grinder for disconnecting the feeding devices from the power shaft to eliminate injury to the hands of the operator when placing materials in the hopper of the grinder.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a rear elevational view of the meat grinder equipped with a feeding attachment constructed in accordance with the present invention and illustrating the gear train for operating the feed rollers;

Figure 2 is a side elevational view of the meat grinder shown in Figure 1, showing the clutch device and operating ring therefor above the hopper disconnecting the feeding device from the power shaft and illustrated in its disconnected position by dotted lines;

Figure 3 is a horizontal sectional view taken on line 3—3 of Figure 2;

Figure 4 is an enlarged detail sectional view taken on line 4—4 of Figure 2;

Figure 5 is a side elevational view of another form of feeding attachment embodying a tensioned tamper above the feed hopper and an operating cam on the power shaft;

Figure 6 is a side elevational view of another form of feeding device with another form of operating cam for the feeding device;

Figure 7 is a detail sectional view taken on line 7—7 of Figure 6; and

Figures 8 and 9 are side and rear elevational views respectively of another form of feeding device and operating cam therefor.

Referring more in detail to the accompanying drawings, and particularly Figures 1 to 4, the grinder disclosed thereby may be designed for use in various arts, but will herein be referred to as a meat grinder, the same comprising the usual upwardly flaring feed hopper rising from the grinder body 11 that carries a grinder cylinder 12, the body 11 being equipped with the usual depending clamp and screw assembly 13 to facilitate lodging the grinder upon a table or other support.

A grinder screw 14 is journalled longitudinally of the body 11 and cylinder 12 by means of the shaft 15 that is journalled at its forward end in a spider 16 in the outlet end of the cylinder 12 and through the rear wall of the grinder body 11, the rear end 15a of the shaft carrying the usual crank handle 17 for operation thereof. A pair of shafts 18 and 19 are journalled at their ends in the front and rear walls of the grinder body 11 respectively at opposite sides of the longitudinal axis of the body and above the grinder screw 14, those portions of the shafts 18 and 19 between the front and rear walls of the grinder body being of rectangular form as shown at 20 in Figure 4 to constitute keys for locking the feed rollers 21 thereto. Peripheral fins or blades of any appropriate design are carried by the rollers 21, being designated by the reference character 22 for the purpose of feeding material in the hopper 10 downwardly onto the meat and grinder screw 14. The shafts 18 and 19 are restrained from axial movement by means of the collars 23 and 24 retained in position on the rear projecting ends of the shafts 18 and 19 by means of the set screws 25 while the forward ends of the shafts 18 and 19 projecting through the front wall of the body 11 are threaded for the reception of thumb nuts 26.

The operating means for the feed rollers 21 include a pinion 27 fixed to the shaft end 15a that meshes with a pinion 28 carried by a hub 29 that is splined as at 33 upon the projecting shaft end 19. The pinion 28 slidable upon the shaft end 19 remains constantly engaged with the pinion 27 upon the shaft end 15a as the pinion 27 is of a width to maintain such meshing engagement within the limits of movement of the pinion. A gear 30 is carried by the collar 23 fixed to the shaft 19 intermediate the end wall of the grinder body 11 and pinion 28 and the collar 23 constitutes one element 30a of a clutch that cooperates with the clutch element 28a on the adjacent end of the collar 29, these clutch elements 30a and 28a being illustrated in Figure 3 in their separated positions. The gear 30 meshes with a gear 31 rigid with the collar 24 on the shaft 18 so that when the clutch elements 30a and 28a are engaged, rotation of the shaft 15a is imparted by the pinion 28 and meshing gears 30 and 31 for the rotation of the feed rollers 21.

A safety device is associated with the feed hopper 10 to be engaged by the hand of the operator when placing materials in the hopper for rendering the gear train inoperative by separation of the clutch elements 30a and 28a, such safety device including a lever 34 as shown in Figures 1 and 2 that is pivotally mounted at its upper end as at 35 to a lug projecting from the feed hopper 10 and carrying at its upper end a ring element 37 that overlies the upper end of the feed hopper 10. The lower end of the lever 34 is forked as at 36 for straddling the collar 29 and received in the annular groove 32 thereof. A coil spring 38 is interposed between the feed hopper 10 and lever 34 below the pivot 35 for normally influencing the lower forked end 36 of the lever in a direction toward the grinder body 11 for moving the clutch element 28a into engagement with the clutch element 30a. With the lever 34 in the position shown by full lines in Figure 2, rotation of the pinion 27 is communicated to the pinion 28 and by means of the clutch element, the gears 30 and 31 are rotated for rotating the feed rollers 21. When foods or other materials are placed into the feed hopper 10, the hand of the operator engages the ring 37 to depress the same to the dotted line position shown in Figure 2 for sliding the collar 29 on the shaft 19 to separate the clutch element 28a from the clutch element 30a and when these parts are so positioned, the shaft 15a may continue to revolve with the pinion 27 driving the pinion 28 freely on the shaft 19 while the gears 30 and 31 remain stationary and the feed rollers 21 are also idle. The spring 38 automatically returns the clutch elements and gears of the train to operative positions when pressure on the safety ring 37 is relieved.

In the form of the invention illustrated in Figure 5, the shaft 15a that drives the feed screw 14 and is operated by the crank 17 has a cam disk 40 fixed thereto that engages the lower end of a perpendicular slide rod 41 guided by the bracket arm 42 projecting laterally of the feed hopper 10, the rod 41 being retained in its lowered position in engagement with the cam disk by means of the surrounding coil spring 43. The upper end of the rod 41 is pivotally attached as at 44 to a spring arm 45 that is pivotally mounted as at 46 upon the bracket arm 47 projecting laterally of the upper end of the feed hopper 10, the upper end of the arm 45 being bent downwardly to overlie the feed hopper and carrying a tamping disk 48 at its lower end. Upon rotation of the shaft 15a, the cam disk 40 elevates the rod 41 for the operation of the pivoted arm 45 to cause the tamping head 48 to descend into the feed hopper 10 for moving the material downwardly into the feed hopper for delivery to the grinding or feeding screw.

Another form of feed or tamping device for a food or other grinder is shown in Figures 6 and 7, wherein the shaft 15a carries a cam disk 49 that is surrounded by a circular strap 50 that has a pivotal lug connection 51 with the lower end of a perpendicularly sliding rod 52 guided in its movement by the bracket 53 projecting laterally of the feed hopper 10. The upper end of the rod 52 is angularly bent as at 54 and at the terminal end thereof overlying the feed hopper 10 there is provided a screw bearing 55 through which a screw rod 56 is adjustably threaded and is provided upon its lower end with a tamping disk 57. The rotation of the shaft 15a effects vertical reciprocatory movements of the rod 52 and similar movements for the tamping disk 57 that is adjustable as described.

Still another form of feed or tamping device for a grinder or similar machine is illustrated in Figures 8 and 9 wherein the shaft 15a has a disk 58 eccentrically fixed thereto and is provided with a cam groove 59 in one side face thereof that receives the pin 60 projecting laterally of the lower end of the resilient rod 61 vertically slidable in a guide 62 carried by the feed hopper 10. The upper end of the rod 61 is bent laterally and downwardly as at 63 and carries a tamping head 64 at its lower end overlying the feed hopper 10.

From the above detailed description, it is believed that the operation of the several forms of the invention will at once be apparent and while there are herein shown and described the preferred embodiments of the invention, it is nevertheless to be understood that minor changes may be made therein without departing from the spirit and scope of the invention as claimed.

I claim:—

1. In a device of the class described, a meat grinder including a spiral cutter, an operating shaft therefor, feed rollers journalled above and laterally of the cutter, a gear train interposed between the shaft and feed rollers, a two-part clutch in the gear train, and means for separating the clutch parts to render the gear train inactive, said means including a lever pivoted on the upper end of the grinder at the outer side thereof, a ring carried by the lever and overlying the grinder adjacent the marginal edge thereof, a connection between the other end of the lever and one of the clutch parts and a spring connection between the lever and grinder for normally holding the clutch parts in engagement for operation of the gear train.

2. In a device of the class described, a meat grinder including a spiral cutter, an operating shaft therefor, feed rollers journalled above and laterally of the cutter, a gear train interposed between the shaft and feed rollers, a two-part clutch in the gear train, and means for separating the clutch parts adapted to be manually operated during feeding of meat to the grinder for rendering the gear train inactive, said means including a lever pivoted on the upper end of the grinder at the outer side thereof, a ring carried by the lever and overlying the grinder adjacent the marginal edge thereof, a connection between the other end of the lever and one of the clutch parts and a spring connection between the lever and grinder for normally holding the clutch parts in engagement for operation of the gear train.

3. In a device of the class described, a meat grinder including a spiral cutter, an operating shaft therefor, feed rollers journalled above and laterally of the cutter, a gear train interposed between the shaft and feed rollers, a two-part clutch in the gear train, the grinder adapted to be manually operated during feeding of meat to the grinder for rendering the gear train inactive, said means including a lever pivoted on the upper end of the grinder at the outer side thereof, a ring carried by the lever and overlying the grinder adjacent the marginal edge thereof, a connection between the other end of the lever and one of the clutch parts and a spring connection between the lever and grinder for normally holding the clutch parts in engagement for operation of the gear train.

WALTER NATURKACZ.